US00RE47071E

(19) United States
(12) Reissued Patent
Mohamad et al.

(10) Patent Number: US RE47,071 E
(45) Date of Reissued Patent: Oct. 2, 2018

(54) CUSTOMIZABLE INFORMATION MANAGEMENT SYSTEM

(71) Applicant: FileOnQ, Inc., Tukwila, WA (US)

(72) Inventors: Ali Mohamad, Issaquah, WA (US); Manoj Philip, Calgary (CA)

(73) Assignee: FileOnQ, Inc., Tukwila, WA (US)

(21) Appl. No.: 15/392,981

(22) Filed: Dec. 28, 2016

Related U.S. Patent Documents

Reissue of:
(64) Patent No.: 7,599,942
Issued: Oct. 6, 2009
Appl. No.: 10/201,804
Filed: Jul. 23, 2002

U.S. Applications:
(60) Provisional application No. 60/308,362, filed on Jul. 26, 2001.

(51) Int. Cl.
*G06F 9/451* (2018.01)
*G06F 9/44* (2018.01)
*G06Q 20/40* (2012.01)

(52) U.S. Cl.
CPC ..... *G06F 9/451* (2018.02); *G06F 9/4443* (2013.01); *G06Q 20/405* (2013.01)

(58) Field of Classification Search
CPC ..... G06F 9/4443; G06Q 20/405
USPC ..... 707/999.1, 999.101, 999.102, 802, 803, 707/805; 715/222
See application file for complete search history.

(56) References Cited

U.S. PATENT DOCUMENTS 6,016,492 A * 1/2000 Saxton et al. ..... 707/100
6,757,720 B1 * 6/2004 Weschler, Jr. ..... 709/220
6,865,576 B1 * 3/2005 Gong et al. ..... 707/100
6,889,260 B1 * 5/2005 Hughes ..... 709/246
2002/0111972 A1 * 8/2002 Lynch et al. ..... 707/523

FOREIGN PATENT DOCUMENTS

EP 1158444 A1 * 11/2001

OTHER PUBLICATIONS

Andrew Westlake, A Simple Structure for Statistical Meta-Data, 1997, IEEE, pp. 186-195.*
Baker et al., What Terms Does Your Metadata Use? Application Profiles as Machine-Understandable Narratives, 2001, National Institute of Informatics, pp. 151-159.*
Hunter et al., Combining RDF and XML Schemas to Enhance Interoperability Between Metadata Application Profiles, 2001 , ACM, pp. 1-23.*
Hans-J. Lenz, The conceptual Schema and External Schemata of Metadatabases, 1994, IEEE, pp. 160-165.*

* cited by examiner

*Primary Examiner* — Joshua Campbell
(74) *Attorney, Agent, or Firm* — John W. Branch; Lowe Graham Jones PLLC

(57) ABSTRACT

An application or a tool is provided that allows building an application including its business rules, validation, and related sub-systems at one time from a user perspective with simplified user interface and simplified terminology. The system may be customizable at an advanced level as well. The method provided for managing information includes: forming a meta data structure containing first information; forming an application data structure containing second information; and establishing associations between the meta data structure and the application data structure wherein the first information has the second information associated therewith.

28 Claims, 3 Drawing Sheets

CUSTOMIZABLE INFORMATION MANAGEMENT SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims the benefit of U.S. Provisional patent application Ser. No. 60/308,362 filed Jul. 26, 2001, which is incorporated herein by reference thereto.

TECHNICAL FIELD

The present invention relates generally to information management systems, and more particularly to a system which can be quickly customized for user/clients in different industries.

BACKGROUND ART

In the past, information management system applications, such as record management systems, had to be built by the supplier on a custom basis for the particular business or industry of the user/clients. The user/clients have specific requirements from a user interface perspective (UI) of the data that needs to be stored in the database, plus all the business rules behind each information field for inputting data. What happens is there is a core to the product that handles such items as bar codes, but nothing that actually is very specific to the user interface or the fields or the data that is being stored.

When the user/client places an order for a system application, technical people sit down with the user/client at an initial technical meeting and design a user interface, get user/client requirements, and then go back to the office and submit the information to the development group.

It could take probably a week from an investigation perspective to just get their requirements, i.e., just to get the initial design. Then, it has to be submitted to a software development group and scheduled for development. That could take anywhere from six weeks to several months depending on the work load of the development group, the complexity of the product, and how many projects the development group was doing at the same time. When the project is finally scheduled and the time starts for the implementation, the development group has to go back to the software base code and customize it by redesigning the software based on the requirements that were gathered. At that point the application is compiled, so all of that work is being done within a development environment. However, anywhere between one to five people are required to work full time on a particular project. This process can, depending on the complexity, take several weeks to complete for one user/client.

Once the product is compiled, then it has to be presented to the user/client for acceptance. Approximately 90% of the time that initial design is refused because user/clients always change their minds. They always have different requirements; they realize they forgot something; and/or something happened in their business process or workload that changes the initial requirements. Especially because there is such a long time span between the initial technical meeting and delivery, often times it comes back to the development group and has to be either rescheduled or sometimes rushed in. The developers must review the code . Again, it is back to the development stage, redesigning screens, adding new fields, redesigning the database, etc. Finally, it is compiled again and sent to the user/client and hopefully it is approved.

Once it is approved, it is delivered to the user/client. Six months down the line the user/client calls back and says, "We are changing our process and we are adding two new fields to the application. How much would it cost us, and how long will it take?" Again, it is exactly the same process. The same cycle is repeated because the development group must modify or redesign the user interface. The development group will need to redesign the databases and redesign the business rules that associate all of the elements together. So it is back to square one. The development group ends up starting from scratch, rebuilding the application, recompiling it, sending it to the user/client, and hopefully getting approval or acceptance the first time. Typically that does not happen, so it is sent back, and so on. So from a maintenance perspective and the perspective of the longevity of the product, both from a user/client perspective and supplier perspective, the customization process is pretty horrific.

If there were 25 user/clients, then there would be 25 versions of the product. While the core might be the same, everything around the core may be different. And as a matter of fact, even the core can be modified based on requirements or required work-arounds. So if something is required and cannot be easily implemented by simply adding to the product, the core would be modified. So for 100 user/clients, there are 100 versions of the product, and there is never a standard version of the product. From a maintainability perspective or improving the product, if there is a new feature that needs to be to added to the product, it would have to be customized for 100 different products, and each would then have to be supported and maintained.

Further, if a software bug is found, each of the 100 different products must be individually analyzed by going to that particular code and looking to see if the bug affected it because every code would be different.

Even today, it is believed that almost all of the customizable application products are targeted toward developers. The developer must be highly skilled technically in order to build the user interface and to associate the fields to data storage. In addition, almost none of these applications has any business logic behind it. Some of them may encapsulate some business logic into the fields, but there is no relationship between these fields.

Business logic includes, for example, data validation, date ranges, or rules about control dependency, which means controlling what can and cannot be entered on the screen. If a value is selected for a particular field, then other fields will be disabled, for example. All of the current applications are for UI designers or database designers.

For example, with Microsoft Access, it is possible for a non-technical end user to build an application dragging and dropping fields onto a form and then building a database. It is necessary to be a technical developer to connect the two, because the link between the database and the fields is not there. The links between the fields themselves on the screen and in the database are done by a developer and not by an end user.

In summary, in the past and in the current state of the art today, it could easily take months and sometimes years from the time that a sales person and/or a professional services technical support person obtains the requirements of a user/client to when a user/client is able to implement a system.

A system which would be able to reduce the design time and implementation time to a matter of days or weeks, and maybe months if it is a large company, has long been sought by but has eluded those skilled in the art.

DISCLOSURE OF THE INVENTION

The present invention provides an application or a tool that allows building an application including its business rules, validation, and related sub-systems at one time from a user perspective with a simplified user interface and simplified terminology.

Some of the additional features are supported for several platforms, so the present invention can target mobile applications such as cellular phones and through cellular phones to access the Internet. One of the ways that the application can be built is for a cellular interface.

An engine generates the final user/client profile and that engine would be modified to also write to that type of application.

These systems can add new, different types of fields that actually allow improvement of the product and the addition of new features. The user can select some of the ways that fields are represented to improve and support even more features. In addition, the engine can support different types of platforms in the future as opposed to only the platforms that are currently supported today.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
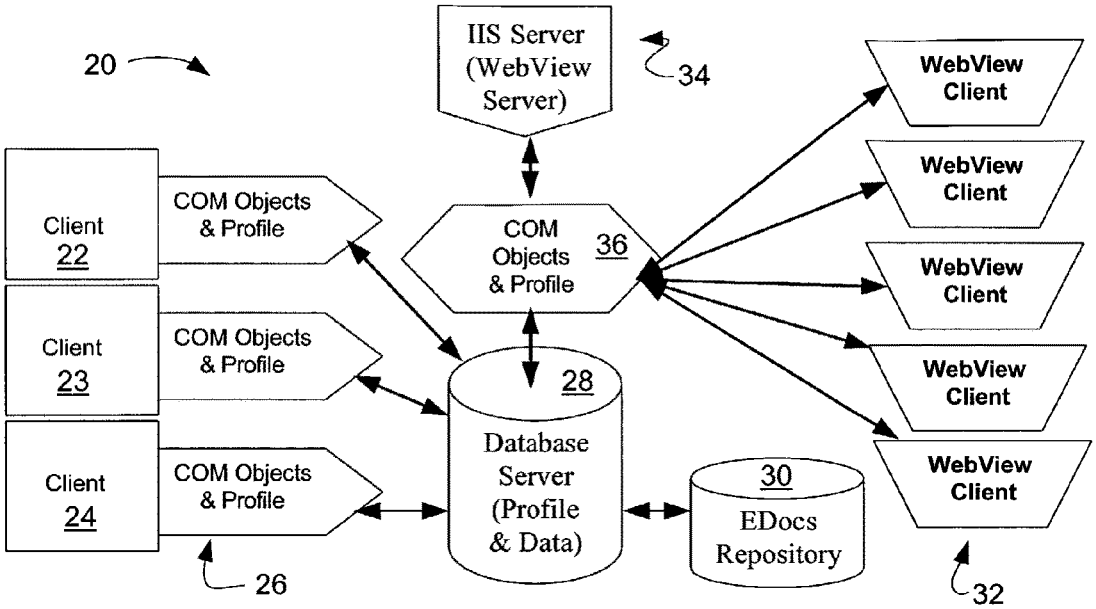
FIG. 1 is a block diagram of a system used with the method of the present invention.

Referring now to FIG. 1, therein is shown is a block diagram of a customizable records and information management system 20 in accordance with the present invention. The system 20 utilizes barcode technology to automate business-critical activities by defining, managing, and quickly delivering the information necessary to efficiently and effectively manage those activities. By transforming disorganized manual documentation into a defined and validated document collection process, the system delivers dramatic productivity improvements.

The system 20 transforms hard copy file systems to document imaging solutions in easy, logical, affordable, proven steps without the risks associated with manual indexing and undefined collection processes. The system 20 can be fully tailored to meet the unique needs and requirements of each user/client 22-24. This tailoring of each application is accomplished through an on-board filing module. This functionality allows the applications to be quickly installed and configured by resellers and user/clients.

The system is a 32-bit, Windows-compliant application. It utilizes some of the latest technologies such as Active-X and COM. Both the Microsoft Database Engine (MSDE) and the Microsoft SQL-Server database engine are usable as the database management technology for the present invention. This provides greater stability than Access and allows the present invention to easily migrate to SQL Servers when an application must scale. The database side of the present invention uses Microsoft ActiveX Data Objects (ADO) for database connectivity. The present invention will run on Windows 95, Windows 98, Windows NT, and Windows 2000.

As an example, users/clients can create profiles 26 that are provided to a database server 28, which stores the profiles and data. An associate server acts as an electronic document (Edocs) repository 30. One portion, WebView, is a browser based Internet application that allows users/clients to search, view and place requests for records. WebView Client 32 provides lower overall deployment and distribution costs over traditional client/server software models. WebView is serviced by an IIS Server (WebView Server) 34, which maintains the COM Objects & profiles 36.

Figure 2:
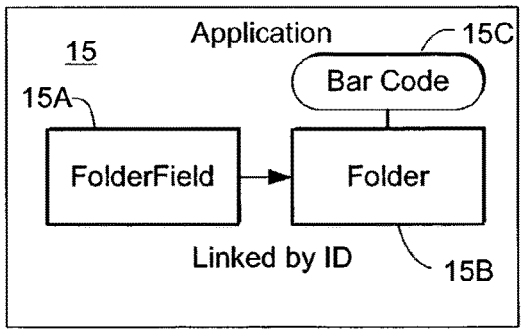
FIG. 2 is an application as used in accordance with the present invention.

Referring now to FIG. 2, therein is shown an Application 15 which includes a Folder Field 15A which is linked by identification to a Folder 15B. The Folder 15B is provided with information through a conventional bar code reader from a Bar Code 15C.

Figure 3:
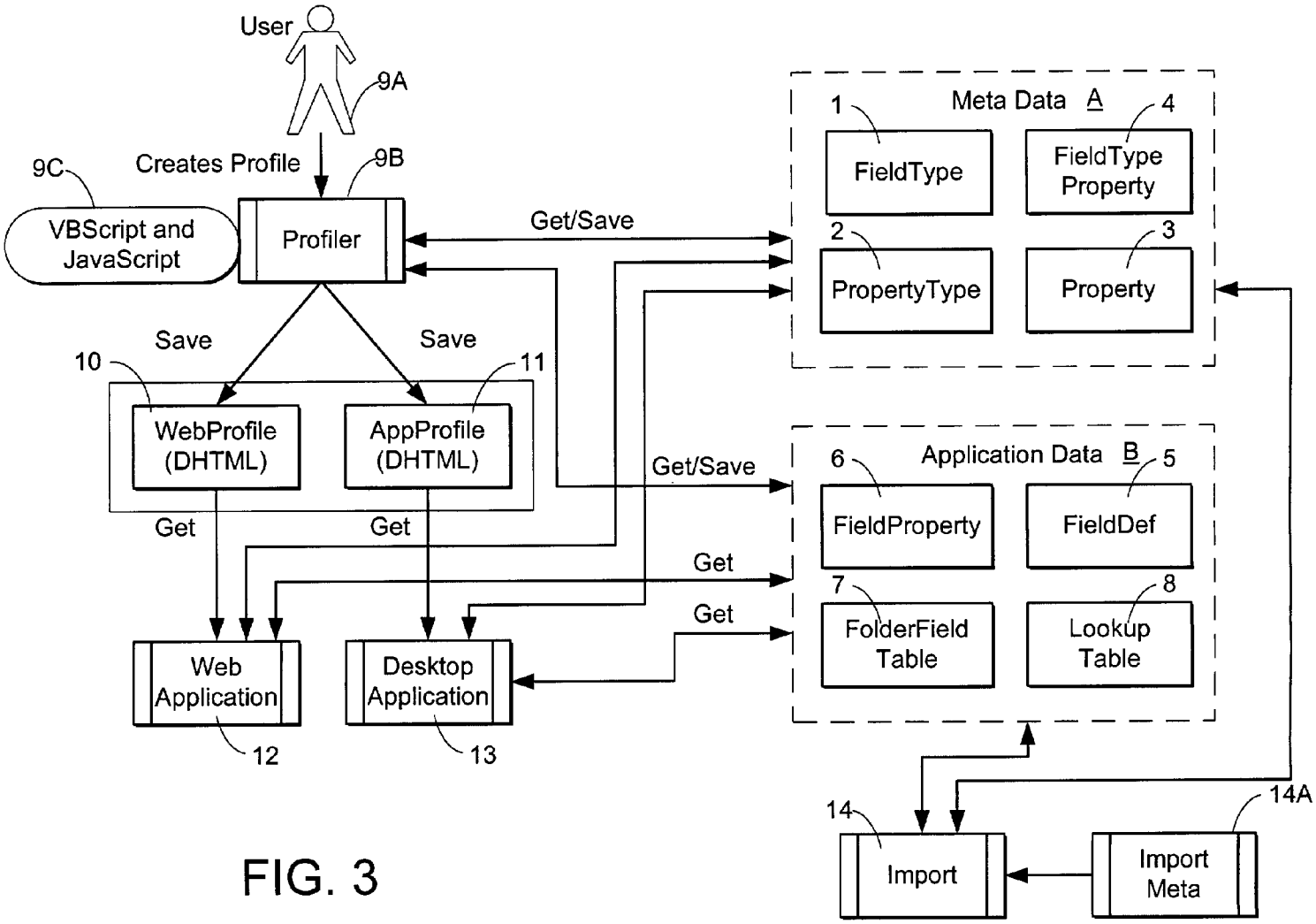
FIG. 3 is a flow chart of a customizable information management system in accordance with the present invention.

Referring now to FIG. 3, therein is shown a block diagram of a Profiler 9B portion of the system in accordance with the present invention.

The Profiler 9B utilizes different types of structures. There are two main types of structures: Meta Data A, or Master List Structures 1-4, and Application Data B, or Run-time Structures 5-8. The structures determine the features of the Profiler 9B and what the Profiler 9B can generate.

The Master List Structures 1-4 are fairly static and not typically changed by the end user/client 9A or by whoever is configuring or setting up the application. The Master List Structures 1-4 drive what the Profiler 9B does, what it presents to the user/client 9A from a user interface, and what it generates as upon a profile. The Run-time Structures 5-8 are the ones that maintain and store what the user creates as an application, and they end up being the driver for later modifications to the product on the user end. Also they end up being the driver to the engine that essentially generates the profile as an application.

There are basically four master structures. They are Field Type 1, Property Type 2, Property 3, and Field Type Property 4.

The Field Type 1 is a list of field types provided by the Profiler 9B and available to users when creating application definitions. So when they are looking at the application, at the Profiler 9B, and they would like to add a field, the Field Type 1 defines that there area text field, a date field, and a mask edit field. So these are the types of fields that a user is presented with.

The Property Type 2 is a list of properties for each field. And each property that is defined within has a type. There are currently three main types in the Profiler 9B but additional different types are possible. But the three of them are generic which means this particular property is a free form text. The user can enter a value there, for example a help prompt. Boolean logic allows a true-false type of logic where typically from a UI perspective is represented by a check box in the Microsoft Windows environment. A list Property Type 2 is something that allows selection of a list of values or entry of a new value. For example, a mask character, which is one of the properties that is in the Profiler 9B, can provide one of the following either as an underscore or a pound as one of the mask characters, or a custom character if it is desired to override these.

The Property 3 is a master list of field properties available in the Profiler 9B. So mask character is one of the properties. Valid Properties are size, input, mask, mask character, default value, tool tip, etc. For example, when the cursor over the field, the properties indicate whether the field can be queried, whether everything entered in it should be converted to upper case, whether it is a required field within a record, etc. Therefore, the Property 3 is the master list of all of the properties available within the Profiler 9B.

The Field Type Property 4 is when a particular type of field is selected within the Profiler 9B; there are certain properties within the master list of properties that are assigned to that particular field. This is where an association is made between them. So it is the association between Field Type 1 and Property 3.

Basically, the four structures define what the Profiler 9B presents to the user so it is important to know that the Profiler 9B is also dynamic in itself. Merely by coming in and modifying, adding for example a new property or modifying the type of a property or adding a new type, actually customizes how the Profiler 9B works and essentially what it generates also because it is all driven through these four master tables or structures.

Run-time Structures 5-8 are the ones that get modified by the user/client 9A behind the scenes. Obviously, the Profiler 9B customizes on behalf of the user/client 9A based on their actions, so when a user/client 9A adds a field, it is added to a Field Definition structure 5. The Field Definition structure 5 is really a master list of all user-defined fields that are created by the user. It is a structure that contains the user defined fields, their names, and their type. The type is basically derived from the Field Type master list 1, label captions, the position within the tabbing sequence, screen positioning, if it is a Lookup field 8 what is the Lookup category, etc. And then the generator engine, a component of the Profiler 9B, uses this structure along with the Field Property structure 6, which will hereinafter be described, next to build a final applications package, basically the final deliverable to that user.

The Field Property Structure 6 defines the relationship between a user-defined field and its properties. So when a particular type of field is selected and dropped on the screen, the Field Property Structure 6 is created also for that field so that when values are assigned to each Property 3, this is where they get stored. So a math character for a particular type of field would be stored in the Field Property Structure 6.

The Folder Field Table 7 is actually not part of the Profiler 9B itself. It is used by the application and this is where the Folder information 15B (shown in FIG. 2) is stored. It is one of the tables that stores Folder information 15B. This particular table actually is the table that presents or stores all the user-defined fields. It is modified by the Profiler 9B. So, based on the profile that is generated, not only does it generate a user interface, but it also modifies the structure of the Folder Field Table 7 and provides the proper data types, the sizes, and everything for these fields within the database based on what the user selected. Just to clarify, the Folder Field Table 7 may contain fields with a suffix, underscore, or number. When a field is deleted in the Profiler 9B, it is removed from the screen but its definition is not removed. Its definition is stored as inactive. And then within that Folder Field Table 7, it is renamed so that it does not appear in the application. This allows user/client support people to undelete unintentionally deleted fields. Because basically there is data in that field and if it is deleted and the end user says, "Oops, I made a mistake" it is normally gone. It is necessary to intentionally run a cleanup utility and saying, "Yes" before any fields are actually deleted. The clean-up utility presents a list of fields that will be deleted and requires an affirmative "Yes" that these are the fields to be deleted, and a command saying "clean up" is required before it cleans up.

The Lookup Table 8 is also a run-time program. It is not really part of the Profiler 9B but the Profiler 9B affects this table in the sense that when a field is defined as a category, it has a Lookup category, which means that it is a Lookup field. Lookup fields are typically drop down menus. They present the end user with a list of values and one of the values selected in this list will be the content. For example, a list of locations such as abbreviations for states of the U.S.A. is really a Lookup field because it should not be necessary for the user to enter the full name of the location. The user may re-enter it ten times with different spellings. So there is a dropdown with each location name and then the user can select one. Customized Lookups can be created within the Profiler 9B. A category name is assigned. For example, "State" is one category for this particular field. Another one would be location names. And then by defining these categories, it is possible to go into the Lookup maintenance in the application, based on these customized categories to enter values for each one of these categories. At run-time, the Profiler 9B generates the final package. That package has code and logic in it to go and retrieve the values or the list of values for a particular location or a bit of a category.

When the user opens the Profiler 9B, initially it is empty. When the system is first received, the user/client 9A can actually install the system on their own and start the Profiler 9B. An empty screen initially will be seen. Then the user can drop fields onto the form, move them around, resize them, give them properties, and then save the profile. What the Profiler 9B does in the end is basically store all of its data into Run-time Structures 5-8, but in addition to that, it also stores the user/client profile. The profile is a form or a syntax that is stored internally within the database that essentially becomes the package that is used by the user interface or by the application to present the fields.

Not only does the Profiler 9B generate the screen itself, but also the logic behind it. So within the Profiler 9B there is stored the Profiler VB Script and Java Script code 9C that gets inserted based on the fields that are selected and based on the relationships between these fields. So validation, making sure that certain fields are enabled and disabled at different times, based on the values that are selected, occurs automatically and the Profiler 9B automatically adapts to that situation.

The Profiler 9B generates a WebProfile 10 and an application profile, AppProfile 11. These profiles contain the field definitions and their business rules, as required by the targeted platforms. If a web product is enabled within the Profiler 9B, because the Profiler 9B is also a customization tool to enable/disable packages or modules within the product, WebView is enabled. In addition to creating the typical profile, the AppProfile 11, that is used within a Desktop Application 13, the Profiler 9B also builds the WebProfile 10. It provides what the screen will look like and what the functionality and business rules behind every field and every screen that will be utilized by either the WebView or the Desktop Application 13. Essentially, the Web Application 12 and the Desktop Application 13 utilize the application data in Meta Data A also in conjunction with a profile to make sure that the application is rendered correctly and the business rules are implemented.

When the Profiler 9B starts, it goes through the list of properties and fields that it has available to it, and it presents them in a user interface, for example a text field, a check box, or a date field. These types of fields are defined in the master list tables or structures and they are utilized by the Profiler 9B to present a dropdown that says, "Which field would you like to add?"

In the Profiler 9B there is a control called the Dynamic HTML editor. When a type of field is selected for addition, based on the master tables, default locations are defined for where the field will be dropped onto the form. For example, it could be dropped at the right bottom part of the screen. So Field Type 1, for example, in addition to having the identification encoded in, also defines the user interface, how the user interface represents each field type. So there is a template code that is stored in the master table Field Type 1 that defines what needs to be done or added to that control, for example, the dynamic HTML edit control, when a text field is dropped. The tables also define what the field looks like.

In addition, code is built into the Profiler 9B that is added or appended to that definition to make sure that there is a link from an event handling purpose and also for validation when properties are defined in that field. Then a save is performed. That control, in addition to being added on that form, is essentially the definition that is built and stored in the database, It is based on that particular position on the form where it has been dragged and dropped, or the form resized, and also based on what is in the Profiler 9B itself in terms of VB Script or Java Script code 9C.

What also happens, besides the ability to just drag-and-drop the field onto the form, is that for each field type that is dropped on the form, the Profiler 9B says, "OK, I just dropped a text field". The association between Field Type 1 and Property Type 2, Property 3 and Field Type Property 4, which are the master lists themselves, is determined. If there is a text field, what properties are required to prompt or allow the user to enter are determined. For example, with a date field, it does not make sense to prompt for the mask character or the length of the field. It is two digits for the month, two digits for the day, and then four digits for the year. There is no way around doing that. It does not make sense to provide, for example, the masking ability to enter a phone number in a date field. So, the Profiler 9B knows by looking at these master tables that it needs to present these lists of properties to the user so he/she can modify and set particular properties for that particular field.

Certain types of fields may be queriable while other types of fields may not be. Being queriable is a function within the product. When the end user says, "I would like to query on something", a value is placed within that field and then entered. Does it participate in the query processing? That is something that is defined in the Profiler 9B based on its type. There are two types of Lookups, coded Lookups and a simple Lookup. For example, states could be CA for California, or there may be just a list of user names, no code. Those are called simple Lookups. Based on the type of Lookup that being added to the form there are different properties that are assigned. So this is what the Profiler 9B does. It looks at the master tables and it says, "OK. Here are the properties that I need to present the user with". When the user selects the properties, everything is stored in memory in a structure so that later on the data gets saved primarily to the Field Definition Table 5, which is one of the Run-time Structures 5-8 that the Profiler 9B utilizes. It is used to implement or save the final dynamic profile definitions including the business rules and logic (code) 9C.

The Profiler 9B is really the heart of the application. It does not work by itself. It just generates a profile that essentially is used by another application or several applications. For example, when it is utilized by several applications, one of which is the Desktop Application 13, it reads the Meta Data A, which are the master list tables and the run-time tables to present the user with a user interface (UI), the business rules, and everything else. So it is based on what the Profiler 9B generates, that the application actually works. Without the Profiler 9B, the application does not work. It is an empty application.

The Web Application 12 is exactly the same. The Profiler 9B is required so that the application can know what it needs to represent to the user and what business rules to implement from a desktop and WebView perspective.

Also from a batch perspective, batch Import processing is implemented. Batch Import 14 is another way to do user data entry, but in batch mode. So whatever is implemented in the user interface from a validation and business rule processing should be implemented in the batch process. What is done in the user interface is that all of these rules are implemented by the Profiler 9B and they are pretty much controlled by the profile that is generated from the Profiler 9B, so everything is dynamic and these rules are built as the application is built. The Import 14 takes that same information, the Meta Data A, master list and the run-time tables in addition to an Import Meta Data Table 14A, additional table, and implements business rule validation and a relationship between fields and everything else requires dependency between different types of fields in batch mode so that several thousand records can be imported at a time. The Import tool is a completely different tool from the rest of the Import applications that are out there on the market in that it actually implements dynamic rules and implements business rules in batch mode and with good performance.

The Web View Application 12 and the Desktop Application 13, respectively, are essentially empty applications until they load the profile from the database where it has been stored. These applications, particularly the Desktop Application 13, use Bar Codes 15C as a major component in order to drive the tracking and transferring of records.

Summarizing, the Profiler 9B generates a profile, which is a user interface definition plus a data storage definition. That data storage definition is only half the formula of storing a record within the system. The other half is what is defined by file and queue. So there are two parts to a record. A record is defined by the user using the Profiler 9B, which describes which fields and the association between these fields. And then there is the other part of a record, which maintains the ability to transfer records from one location to another, to do auditing, and to do all kinds of other things. And those fields, or those properties of a record, are defined within the Folder structure. The Folder structure 15B is basically the other half of the Folder Field structure 15A, which is modified by the Profiler 9B. That Folder structure 15B defines a Bar Code 15C and basically is an identifier of a record. It is a unique value that can be printed using a Bar Code font, can be scanned using a Bar Code reader, and essentially using the Bar Code 15C allows a record to be transferred from one location to another, or to be retrieved and viewed on the screen using a profiled application.

So essentially the application is generally empty. The part that is the user interface is empty when the application is initially purchased and no profile has been created. The Bar Code 15C exists, but it means nothing because it is just a unique ID. Once the profile is generated and saved into the database, the user interface definition is also saved and that defines what is represented to the user from a data perspective. But again behind the scenes is this other piece of data that stores the current location, stores the Bar Code, stores many other things about that particular record. And that is how the application utilizes the profile in conjunction with the Bar Codes 15C.

In addition, scripting ability exists within the Profiler 9B itself so when there are users who are capable of writing code in addition to using this user interface, they have the option to go to an advanced mode and enter code that associates data with a particular field. So validation is not only done by the Profiler 9B based on its rules, but is also implemented as a custom solution that the user can later on go in and modify at run-time again. This is not at compile time, so it can be done between a user/client 9A for example and an integrator or consulting services.

In addition, adding more generator engines enable different destination or target platforms to be supported, such as personal digital assistants which, generally speaking, are considered wireless applications. The Profiler 9B can also generate a Microsoft Outlook view, like a dashboard view, or can generate other types of applications. Because the Profiler 9B really is just a way to combine user interface and business rules together based on a user defined drag-and-drop methodology. But the end result of the Profiler 9B does not have to be a browser or the Desktop Application. It can be any other application. It can be self-contained within the Profiler 9B itself.

So the Profiler 9B is able to target several platforms, in addition to adding new features such as customization by the user to add more code, to add more logic.

Figure 4:
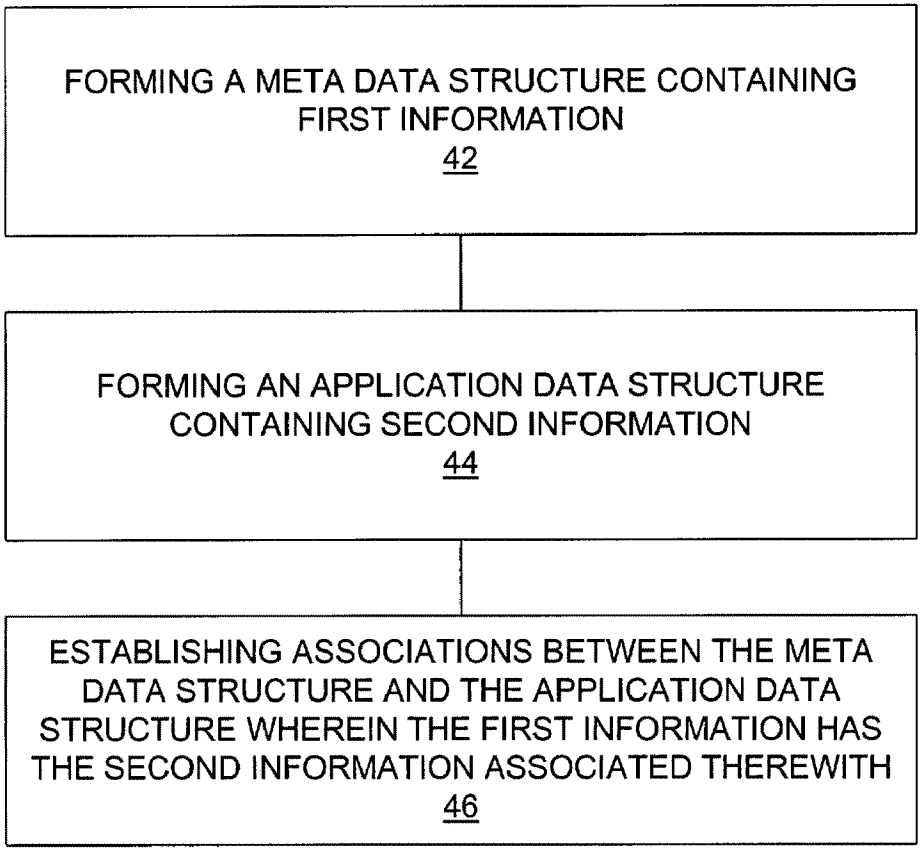
FIG. 4 is a simplified flow chart of the method of the present invention.

Referring now to FIG. 4, therein is shown a simplified flow chart 40 of the method of the present invention. A first step 42 comprises forming a meta data structure containing first information. A second step 44 comprises forming an application data structure containing second information. And, a third step 46 comprises establishing associations between the meta data structure and the application data structure wherein the first information has the second information associated therewith.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hitherto-fore set forth herein or shown in the accompanying drawings are to be interpreted in an illustrative and non-limiting sense.

The invention claimed is:

1. A method for managing information *with one or more computers that execute instructions to perform actions,* comprising:

[forming] *instantiating a system application to perform actions, including:*

*generating* a meta data structure containing first information [for], *wherein the first information is employed by the system application to perform further actions, including*:

[providing] *generating* a user interface, determining features for the user interface, and determining [the] contents of a profile; *and*

[forming] *generating* an application data structure containing second information [for], *wherein the second information is employed by the system application to perform further actions, including*:

maintaining *provided* user application information, storing *the* user application information, and

[driving] *employing* an engine to generate the profile as an application; and establishing associations between the meta data structure and the application data structure, wherein the *corresponding association of the* first information [has] *and* the second information [associated therewith to form and] *are employed to* display [a] *the* profiler *application and the association, and wherein the first information is employed by the profiler application to enable static actions and the second information is employed by the profiler application to enable user modifiable actions*; [and]

*employing a physical bar code reader to scan a bar code and other information to uniquely identify a record comprised of data defined by the first information and second information that is configured with the use of the profiler application to display the record to a user or transfer the record from a disposition to another disposition; and*

[wherein:]

[forming] *employing* the meta data structure [includes forming] *to include* master list structures having:

a field type structure *that is employed to present one or more types of fields to the user,* having:

a list of field types available to a user, a text field, a date field, and a mask edit field; *and* a property type structure *that is employed to allow selection of a list of values or entry of a new value by the user,* having:

a list of properties for a field, a list of values for [a] *the* field,

Boolean logic, and a new value entry; *and* a property structure having:

*a list of* valid properties *for the field,* and a master list of all properties available in the profiler *application*; and a field type property structure *that is employed to associate the field type structure with the property structure*.

2. The method as claimed in claim 1 wherein:

[forming] the application data structure includes [forming] run-time structures having:

a field definition structure having:

a master list of all user-defined fields created by [a] *the* user, a field name, and a field type; and a field property structure having:

relationships between a user-defined field and a property of the user-defined field and values of the property.

3. The method as claimed in claim 1 additionally comprising:

[forming] *providing* tables including:

a folder field table for:

storing a folder record, storing a user-defined field,
generating [a] *the* user interface,
provides proper data types and sizes for a folder, and
permitting undeleting of an unintentionally deleted field; and
a lookup table for:
providing a drop down menu.

4. The method as claimed in claim 1 additionally comprising:
reading the meta data structure by [an] *the* application;
reading the application data structure by the application; and
adding customization information to [form a] *the* profile.

5. The method as claimed in claim 1 additionally comprising:
reading the meta data structure by [an] *the* application;
reading the application data structure by the application;
adding customization information to [form a] *the* profile;
entering user information using the profile to [form] a folder.

6. The method as claimed in claim 1 additionally comprising:
reading the meta data structure by [an] *the* application;
reading the application data structure by the application;
adding customization information to [form a] *the* profile; and
entering user information using a mode selected from a group consisting of an individual mode, a batch mode, a bar code mode, and a combination thereof.

7. The method as claimed in claim 1 additionally comprising:
reading the meta data structure by [an] *the* application including a web application and a desktop application;
storing a web profile for the web application; and
storing an application profile for the desktop application.

8. The method as claimed in claim 1 additionally comprising:
validating associations of the meta data structure and the application data structure using dynamic HTML or another syntax appropriate for other targeted platforms.

9. The method as claimed in claim 1 additionally comprising:
adding a generator engine for targeting a wired and wireless platform.

10. A method for managing information *with one or more computers that execute instructions to perform actions,* comprising:
[forming] *instantiating a system application to perform actions, including:*
*generating* a meta data structure containing first information using a database server [for], *wherein the first information is employed by the system application to perform further actions, including*:
[providing] *generating* a user interface,
determining features for the user interface, and
determining [the] contents of a profile; *and*
[forming] *generating* an application data structure containing second information using the database server [for], *wherein the second information is employed by the system application to perform further actions, including*:
maintaining *provided* user application information,
storing *the* user application information, and
[driving] *employing* an engine to generate the profile as an application; and
establishing associations between the meta data structure and the application data structure, wherein the *corresponding association of the* first information [has] *and* the second information [associated therewith to form and] *are employed to* display a profiler [using the database server] *application and the association, and wherein the first information is employed by the profiler application to enable static actions and the second information is employed by the profiler application to enable user modifiable actions*; [and]
*employing one or more of a physical bar code reader to scan a bar code or other readers to uniquely identify a record comprised of data defined by the first information and second information that is configured with the use of the profiler application to display the record to a user or transfer the record from a disposition to another disposition; and*
[wherein:]
[forming] *employing* the meta data structure [includes forming] *to include* master list structures using the database server and having:
a field type structure *that is employed to present one or more types of fields to the user,* having:
a list of field types available to a user,
a text field,
a date field, and
a mask edit field; *and*
a property type structure *that is employed to allow selection of a list of values or entry of a new value by the user,* having:
a list of properties for a field,
a list of values for [a] *the* field,
Boolean logic, and
a new value entry; *and*
a property structure having:
*a list of* valid properties *for the field,* and
a master list of all properties available in the profiler *application*; and
a field type property structure *that is employed to associate the field type structure with the property structure*.

11. The method as claimed in claim 10 wherein:
[forming] the application data structure includes [forming] run-time structures using the database server and having:
a field definition structure having:
a master list of all user-defined fields created by [a] *the* user,
a field name, and
a field type; and
a field property structure having:
relationships between a user-defined field and a property of the user-defined field and
values of the property.

12. The method as claimed in claim 10 additionally comprising:
[forming] *providing* tables including:
a folder field table for:
storing a folder record,
storing a user-defined field,
generating [a] *the* user interface,
provides proper data types and sizes for a folder, and
permitting undeleting of an unintentionally deleted field; and
a lookup table for:
providing a drop down menu.

13. The method as claimed in claim 10 additionally comprising:

reading the meta data structure by [an] *the* application;
reading the application data structure by the application; and
adding customization information to [form a] *the* profile.

14. The method as claimed in claim 10 additionally comprising:
reading the meta data structure by [an] *the* application;
reading the application data structure by the application;
adding customization information to [form a] *the* profile;
entering user information using the profile to [form] a folder.

15. The method as claimed in claim 10 additionally comprising:
reading the meta data structure by [an] *the* application;
reading the application data structure by the application;
adding customization information to [form a] *the* profile; and
entering user information using a mode selected from a group consisting of an individual mode, a batch mode, a bar code mode, and a combination thereof.

16. The method as claimed in claim 10 additionally comprising:
reading the meta data structure by [an] *the* application including a web application and a desktop application;
storing a web profile for the web application; and
storing an application profile for the desktop application.

17. The method as claimed in claim 10 additionally comprising:
validating associations of the meta data structure and the application data structure using dynamic HTML or another syntax appropriate for other targeted platforms.

18. The method as claimed in claim 10 additionally comprising:
adding a generator engine for targeting a wired and wireless platform.

19. A method for managing information *with one or more computers that execute instructions to perform actions,* comprising:
[forming] *instantiating a system application to perform actions, including:*
*generating* a meta data structure containing first information [for], *wherein the first information is employed by the system application to perform further actions, including*:
[providing] *generating* a user interface,
determining features for the user interface, and
determining [the] contents of a profile; *and*
[forming] *generating* an application data structure containing second information [for], *wherein the second information is employed by the system application to perform further actions, including*:
maintaining *provided* user application information,
storing *the* user application information, and
[driving] *employing* an engine to generate the profile as an application; and
establishing associations between the meta data structure and the application data structure, wherein the *corresponding association of the* first information [has] *and* the second information [associated therewith to form and] *are employed to* display a profiler *application and the association, and wherein the first information is employed by the profiler application to enable static actions and the second information is employed by the profiler application to enable user modifiable actions;*
*employing a physical bar code reader to scan a bar code and other information to uniquely identify a record comprised of data defined by the first information and second information that is configured with the use of the profiler application to display the record to a user or transfer the record from a disposition to another disposition.*

20. The method as claimed in claim 19 wherein:
[forming] the meta data structure includes [forming] master list structures having:
a field type structure *that is employed to present one or more types of fields to the user,* having:
a list of field types available to a user,
a text field,
a date field, and
a mask edit field; *and*
a property type structure *that is employed to allow selection of a list of values or entry of a new value by the user,* having:
a list of properties for a field,
a list of values for [a] *the* field,
Boolean logic, and
a new value entry; *and*
a property structure having:
*a list of* valid properties *for the field,* and
a master list of all properties available in the profiler *application*; and
a field type property structure [having:
associations between the field type structure and] *that is employed to associate the field type structure with* the property structure.

21. The method as claimed in claim 19 wherein:
[forming] the application data structure includes [forming] run-time structures having:
a field definition structure having:
a master list of all user-defined fields created by [a] *the* user,
a field name, and
a field type; and
a field property structure having:
relationships between a user-defined field and a property of the user-defined field and
values of the property.

22. The method as claimed in claim 19 additionally comprising:
[forming] *providing* tables including:
a folder field table for:
storing a folder record,
storing a user-defined field,
generating [a] *the* user interface,
provides proper data types and sizes for a folder, and
permitting undeleting of an unintentionally deleted field; and
a lookup table for:
providing a drop down menu.

23. The method as claimed in claim 19 additionally comprising:
reading the meta data structure by [an] *the* application;
reading the application data structure by the application; and
adding customization information to [form a] *the* profile.

24. The method as claimed in claim 19 additionally comprising:
reading the meta data structure by [an] *the* application;
reading the application data structure by the application;
adding customization information to [form a] *the* profile;
entering user information using the profile to [form] a folder.

25. The method as claimed in claim 19 additionally comprising:

reading the meta data structure by [an] *the* application;

reading the application data structure by the application;

adding customization information to [form a] *the* profile; and entering user information using a mode selected from a group consisting of an individual mode, a batch mode, a bar code mode, and a combination thereof.

26. The method as claimed in claim 19 additionally comprising:

reading the meta data structure by [an] *the* application including a web application and a desktop application;

storing a web profile for the web application; and storing an application profile for the desktop application.

27. The method as claimed in claim 19 additionally comprising:

validating associations of the meta data structure and the application data structure using dynamic HTML or another syntax appropriate for other targeted platforms.

28. The method as claimed in claim 19 additionally comprising:

adding a generator engine for targeting a wired and wireless platform.

* * * * *